July 20, 1954     F. A. KROHM     2,684,258
WINDSHIELD WIPER ARM
Filed March 23, 1950
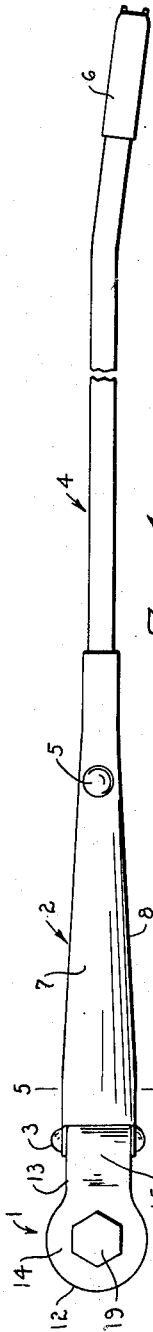
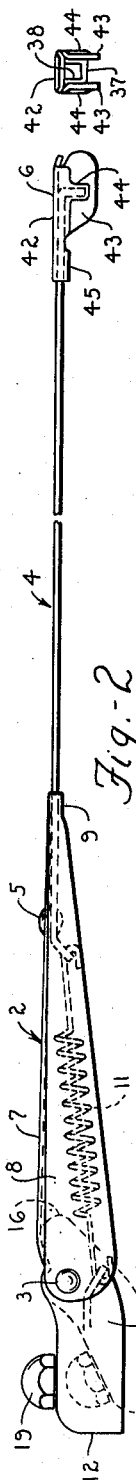
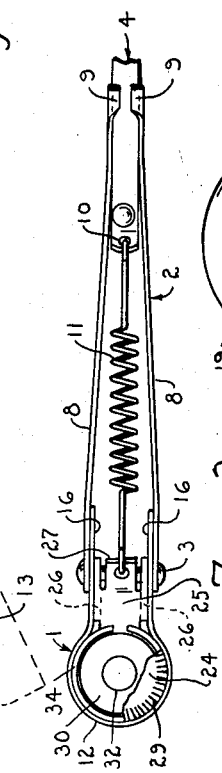
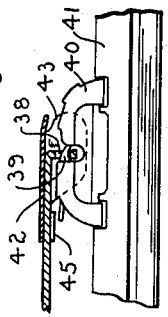
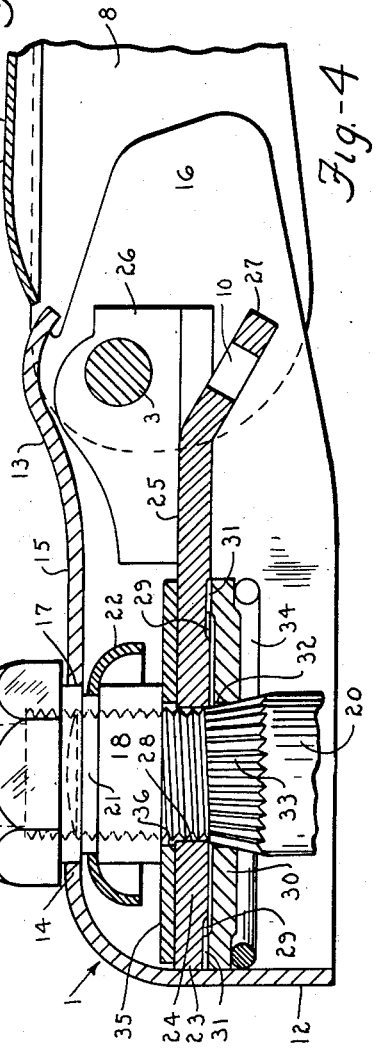
INVENTOR.
FRED A. KROHM
BY
Charles S. Perfold
ATTORNEY

Patented July 20, 1954

2,684,258

UNITED STATES PATENT OFFICE 2,684,258

WINDSHIELD WIPER ARM

Fred A. Krohm, Gary, Ind., assignor to Productive Inventions, Inc., a corporation of Indiana Application March 23, 1950, Serial No. 151,503

3 Claims. (Cl. 287—53)

This invention relates generally to windshield wiper arms and more particularly is directed to improved means for connecting the arm to driving means such as a shaft.

In modern automotive construction and design a shaft preferably projects outwardly in an appropriate angular position with respect to a windshield to support a wiper arm carrying a wiper blade. In mass production it is not always possible to locate the shaft in its proper angular and rotative positions according to specifications. This inability to predetermine the proper rotative position of the shaft is a distinct disadvantage due to the fact that when the wiper arm is connected thereto, it will not assume the position intended or desired, and as a consequence the wiper blade will not clean the area of the windshield required nor will the blade return to its proper parking position with respect to a part of the windshield frame or body of the vehicle.

Automobile manufacturers have further found objectionable certain types of arms which must be removed from the shaft and reset when the prior guess at what would be the proper installation to provide the desired position of the wiper blade with relation to the windshield frame, has been incorrect. Often this resetting operation is omitted, with the result that the vehicle reaches the user with the wiper blade in an awkward position with relation to the windshield frame and interferes with the line of vision of the driver.

The disadvantages above described and which accrue in original equipment installation are likewise disadvantages accruing to the service operator who replaces an original equipment arm, perhaps on a busy gasoline service station drive, where most of such replacements are made and where time saved in such replacement operations is important.

Accordingly, one important object of the invention is to provide improved means whereby the arm may be easily and quickly connected with respect to a shaft and while connected may be adjusted to the desired rotative position with respect to the shaft to overcome or offset the disadvantage alluded to above. More specifically, it might be stated without limitation, that the invention is directed to a wiper arm provided with a clutch mechanism comprising a first clutch member adapted to be keyed to a shaft for movement therewith, a second clutch member movable relative to the first clutch member, and means providing the dual function of connecting the arm to the shaft and operating the clutch mechanism.

Another object of the invention is to provide a construction consisting of a minimum number of parts, which may be economically manufactured and assembled on a production basis, and when assembled are positive and efficient in action and result.

Other objects and advantages of the invention will become apparent after the description hereinafter set forth is considered in conjunction with the drawings annexed hereto.

In the drawings wherein identical parts are designated by the same numerals:

Figure 1 is a top view of a windshield wiper arm embodying the invention;

Figure 2 is a side view in elevation of the arm illustrated in Figure 1 with certain parts thereof shown in dotted lines for the purpose of exemplifying details of construction;

Figure 3 is a bottom view of the wiper arm shown in Figures 1 and 2;

Figure 4 is an enlarged view showing the arm applied to a drive shaft with portions of the arm shown in section for the purpose of exemplifying the operative relationship between various parts of the arm and the shaft;

Figure 5 is a section taken substantially on line 5—5 of Figure 1 showing the configuration of an intermediate section of the arm;

Figure 6 is an end view of connector means provided adjacent the outer end of the arm; and, Figure 7 is a view showing the connector means on the arm applied to a connector carried by a wiper blade.

Referring to the drawings, the wiper arm, among other things, includes an inner section 1 for attachment with a drive shaft, an intermediate tapered channel section 2 pivotally connected to the inner section by a cross pin 3, and an elongated outer bar section 4 having its inner end secured in the intermediate channel section 2 by a rivet 5. Connector means 6 are provided adjacent the outer end of the bar section and will be described subsequently. The intermediate channel section includes a top wall 7 and side walls 8, the latter of which are provided with fingers 9 that are inturned and clamped against the bar section 4 whereby to assist in firmly anchoring the channel and bar sections together. The rivet 5 extends through the top wall 7 of the channel and through the bar as clearly shown. The bar is preferably provided with offset portion having a hole 10 therein for receiving one end of a helical spring 11.

The inner section 1 of the arm is preferably made in the form of a shell or housing comprising a generally cylindrical portion 12 and an integral radial portion 13. The cylindrical portion has a top wall 14 and radial portion 13 includes a top wall 15 and a pair of side walls 16. The side walls 16 are interposed in the channel section 2. The cross pivot pin 3 extends through the side walls 16 and side walls 8 of the intermediate channel section. It will be noted that the side walls 16 of the inner arm section are preferably of a length to engage the bottom wall 7 of the channel section at points in advance of the pin 3 to predetermine an angular position of the inner section relative to the intermediate channel section as shown by the dotted lines in Figure 2, so that the inner section can be readily applied to a shaft. Extending the walls 16 beyond the pin 3 also serves to stabilize the pivotal movement between these sections of the arm.

The top wall 14 of the cylindrical portion 12 of the inner section 1 is provided with a central round hole 17 through which a cylindrical shank 18 of a fastening means preferably in the form of a cap nut 19 extends. The shank is internally threaded to receive the reduced threaded end of a drive shaft 20 as shown in Figure 4. The nut is preferably locked to the inner section by providing the shank 18 with a neck portion 21 and distorting the marginal edges defining an aperture in a locking element 22 into the groove which forms the neck portion.

The clutch mechanism housed in the inner section 1 of the arm includes a stationary clutch member 23 having a round flat portion 24 disposed in the cylindrical portion 12 and an extended portion 25 arranged in the radial portion 13 of the inner section.

The extended portion 25 is provided with parallel walls 26 which bear against the side walls 16 of the portion 13. The pin 3 projects through the holes provided therefor in the walls 26. The extended portion 25 is also provided with an outward offset 27 having a hole therein for receiving the other end of the spring 11. The clutch member 23 is preferably press-fitted into the inner section and since it is also secured by the pin 3, it is firmly anchored in place. The round portion 24 of the clutch member is provided with a round aperture 28 having a diameter slightly greater than the reduced threaded end of the shaft for clearance about the shaft. The underside of portion 24 is provided with a ring of serrations or teeth 29 arranged concentric to the aperture 28.

A second clutch member 30 preferably in the form of a substantially flat disc is provided with a ring of serrations or teeth 31 adjacent its upper side, which correspond to the teeth 29 for interlocking engagement therewith. It will be noted that the clutch member 30 is preferably provided with a round depression so that the teeth 31 are disposed in a plane spaced from the bottom wall of the depression. Thus, only the teeth of the clutch members are adapted for engagement. The depression also serves to impart strength to the member and yet permit its central portion to yield or flex to some extent when the clutch members are forcibly pressed together by the cap nut. With this arrangement the clutch member 30 can readily adjust itself to the shaft and at the same time act as a sort of lock washer. The member 30 is preferably constructed of a material which is somewhat softer than the material of which the drive shaft is constructed and is provided with a central aperture 32 of a diameter substantially corresponding to an intermediate diameter of a tapered serrated shoulder portion 33 formed on the shaft 20. The relative diameters of the aperture 32 and shoulder portion are preferably such that when the various parts are assembled as shown in Figure 4, the member 30 will engage the shoulder substantially mid-way of its length. More particularly in this respect, when member 30 is forced onto the shaft, the serrations on the shaft will bite sufficiently into the material defining the aperture 32 to cause the member to become automatically keyed to the shaft for rotation therewith.

Attention is directed to the fact that any means suitable for the purpose may be employed to hold the clutch member 30 in relation to the stationary clutch member, but as herein illustrated, a split resilient ring 34 is used. This ring is pressed into the cylindrical portion 12 of the inner arm section and frictionally engages the inner surface of portion 12 sufficiently to detachably retain itself and member 30 housed in the inner section.

A concave resilient lock washer 35 is movably mounted in the inner section. This washer is provided with an aperture 36 of a diameter somewhat greater than the threaded end of the shaft for clearance purposes. It is interposed between the inner end of the shank portion 18 of the cap nut and the stationary clutch member 23. The diameters of the clutch member 30 and lock washer are predetermined with respect to the diameter of the cylindrical portion 12 of the inner arm section so that the apertures 32 and 36 are disposed substantially in alignment with the aperture 28 in the clutch member 23 and with the internally threaded aperture in the cap nut. It will be noted that the areas of engagement between the lock washer 35 and the clutch member 23 and between the clutch members are concentric to the apertures 28, 32 and 36 and are spaced a desirable distance from such apertures so as to impart stability to the assembly and at the same time provide a clutch mechanism which is positive and efficient in action.

To connect the arm to the shaft it is merely necessary to arrange the arm in a predetermined rotative position with respect to the shaft and so that the shaft is received in the apertures of the clutch members and lock washer and in registry with the threaded aperture in the cap nut, after which the nut is screwed onto the reduced threaded end of the shaft to cause the shank 18 of the nut to buckle and press the lock washer against the clutch member 23 and clutch member 23 in turn against clutch member 30 to cause at least a portion of the material defining the aperture 32 to become distorted and automatically shape itself to the configuration of the tapered portion 33 of the shaft and the serrations formed therein. With this unique arrangement the teeth or serrations 29 and 31 on the clutch members are interlocked so that the clutch member 23 and the remainder of the arm structure will be keyed for simultaneous rotation with the clutch member 30 and shaft. If for any reason the arm has not been set in its proper rotative position with respect to the longitudinal axis of the shaft, the parts can be readily readjusted by merely unscrewing the nut sufficiently to loosen the fit between the clutch members, whereupon the arm and clutch member 23 may be rotated with respect to clutch member 30 to place the arm in the position desired, so that the blade carried thereby will clean the proper area on the windshield and not slap against the windshield frame. During this readjustment the clutch member 30 will normally remain keyed to the shaft. If the arm is removed from the shaft and then reconnected thereto the clutch member 30 can be secured in a different rotative position on the shaft after which the clutch members can be adjusted as required. It is to be understood that when the arm is first applied to the shaft it is not essential that it be arranged in its proper rotative position, as this can be taken care of after the nut has taken up some of the looseness between the various parts of the clutch mechanism. As pointed out above the clutch member 30 is so formed that it may in some measure act as a lock washer in addition to the washer 35 to assist in accommodating the clutch member 30 to the shaft and in holding the clutch mechanism locked after it has been adjusted. This setup offers the distinct advantage of permitting readjustment of the arm without the necessity of removing the arm from the drive shaft.

The connector assembly provided adjacent the free end of the outer bar section 4 of the wiper arm will now be described. The free end of this section is formed with a right angled substantially square offset 37 having a generally square opening 38 therein, which opening is preferably adapted to receive a spring pressed catch 39 constituting a component of a connector 40 on a wiper blade 41 shown in Figure 7. A channel shaped shroud 42 is attached to the arm section about the offset to embrace the connector 40. This shroud includes a top wall which bears against the top side of the arm and side walls 43. Each wall is provided with an outwardly extending depression 44 which forms an internal groove or recess for receiving the side portion of the offset to lock the shroud on the arm. The shroud is also provided with fingers 45 which are clamped against the underside of the arm to assist in locking the shroud to the arm.

Having thus described my invention, it is obvious that various modifications may be made in the same without departing from the spirit of the invention; and, therefore, I do not wish to be understood as limiting myself to the exact form, construction, arrangement, and combination of parts herein shown and described and defined in the claims.

I claim:

1. An inner housing section of a windshield wiper arm, a first clutch member inseparably secured in the section and having a flat-like disc portion provided with a hole for receiving a shaft and also having serrations about the hole, a second clutch member consisting of a flat-like disc provided with serrations cooperable with the serrations on the first clutch member and having means for effecting a driving connection with a shaft, means carried by the housing section for holding the second clutch member in a predetermined position with respect to the first clutch member, an opening in the housing section, a nut having a portion extending through the opening for applying pressure to the first clutch member, and means arranged in the section cooperating with the said portion of the nut for preventing accidental removal of the nut from the section.

2. A windshield wiper assembly comprising an outer arm section, an inner housing section pivotally connected to the outer section, a first clutch member inseparably secured in the housing section and having a flat-like disc portion provided with a hole for receiving a shaft and also having serrations about the hole, a second clutch member consisting of a flat-like disc provided with serrations cooperable with the serrations on the first clutch member and having means for effecting a driving connection with a shaft, means carried by the housing section for holding the second clutch member in a predetermined position with respect to the first clutch member, an opening in the housing section, a nut having a portion extending through the opening for applying pressure to the first clutch member, and means arranged in the housing section cooperating with the said portion of the nut for preventing accidental removal of the nut from this section, and a spring connected to the outer section and to the first clutch member.

3. A windshield wiper assembly comprising an outer arm section, an inner housing section, pivot means pivotally connecting the outer and inner sections together, a first clutch member disposed in the housing section with said pivot means extending therethrough to secure said member in said housing section, said member having a flat-like disc portion provided with a hole for receiving a shaft and also having serrations about the hole, a second clutch member consisting of a flat-like disc provided with serrations cooperable with the serrations on the first clutch member and having means for effecting a driving connection with a shaft, means carried by the housing section for holding the second clutch member in a predetermined position with respect to the first clutch member, an opening in the housing section, a nut having a portion extending through the opening for applying pressure to the first clutch member, and means arranged in the housing section cooperating with the said portion of the nut for preventing accidental removal of the nut from this section, and a spring connected to the outer section and to the first clutch member.

References Cited in the file of this patent

UNITED STATES PATENTS

| Number | Name | Date |
|---|---|---|
| 907,053 | Huddle | Dec. 15, 1908 |
| 2,193,724 | Horton | Mar. 12, 1940 |
| 2,299,280 | Reed | Oct. 20, 1942 |
| 2,317,245 | Bell | Apr. 20, 1943 |
| 2,345,910 | Fawcett | Apr. 4, 1944 |
| 2,350,134 | Smulski | May 30, 1944 |
| 2,404,523 | Nesson | July 23, 1946 |
| 2,417,991 | Nesson | Mar. 25, 1947 |
| 2,449,357 | Zaiger | Sept. 14, 1948 |
| 2,499,809 | Zaiger | Mar. 7, 1950 |
| 2,528,678 | Anderson | Nov. 7, 1950 |

FOREIGN PATENTS

| Number | Country | Date |
|---|---|---|
| 507,602 | France | June 29, 1920 |